United States Patent [19]

Sugihara et al.

[11] Patent Number: 4,738,783
[45] Date of Patent: Apr. 19, 1988

[54] FLOTATION CYCLONE DEVICE

[76] Inventors: Kazutoyo Sugihara, 964-38, Niihsdhi, Gotenba City, Shizuoka Pref.; Yasuhide Kinoda, 2-3-16, Matsugaoka, Kugenuma, Fujisawa City Kanagawa Pref., both of Japan

[21] Appl. No.: 881,593

[22] Filed: Jul. 3, 1986

[51] Int. Cl.$^4$ .............................................. B01D 21/01
[52] U.S. Cl. .................................. 210/705; 209/169; 209/170; 210/721.2
[58] Field of Search ............... 210/608, 703, 704, 705, 210/220, 221.1, 221.2, 219; 209/162, 163, 164, 165, 166, 167, 168, 169, 176

[56] References Cited

U.S. PATENT DOCUMENTS 3,400,818  9/1968  Tarjan ................................. 209/170
3,764,008  10/1973  Darley et al. ....................... 210/704

Primary Examiner—Frank Sever
Attorney, Agent, or Firm—Gifford, Groh, VanOphem, Sheridan, Sprinkle and Dolgorukov

[57] ABSTRACT

The instant invention provides a method and apparatus to improve the treatment capacity in the flotation process and to reduce the cost of equipment improving the dehydration of the separated scum using only natural dehydration and air-dry that have no need of mechanical dehydration process.

25 Claims, 1 Drawing Sheet

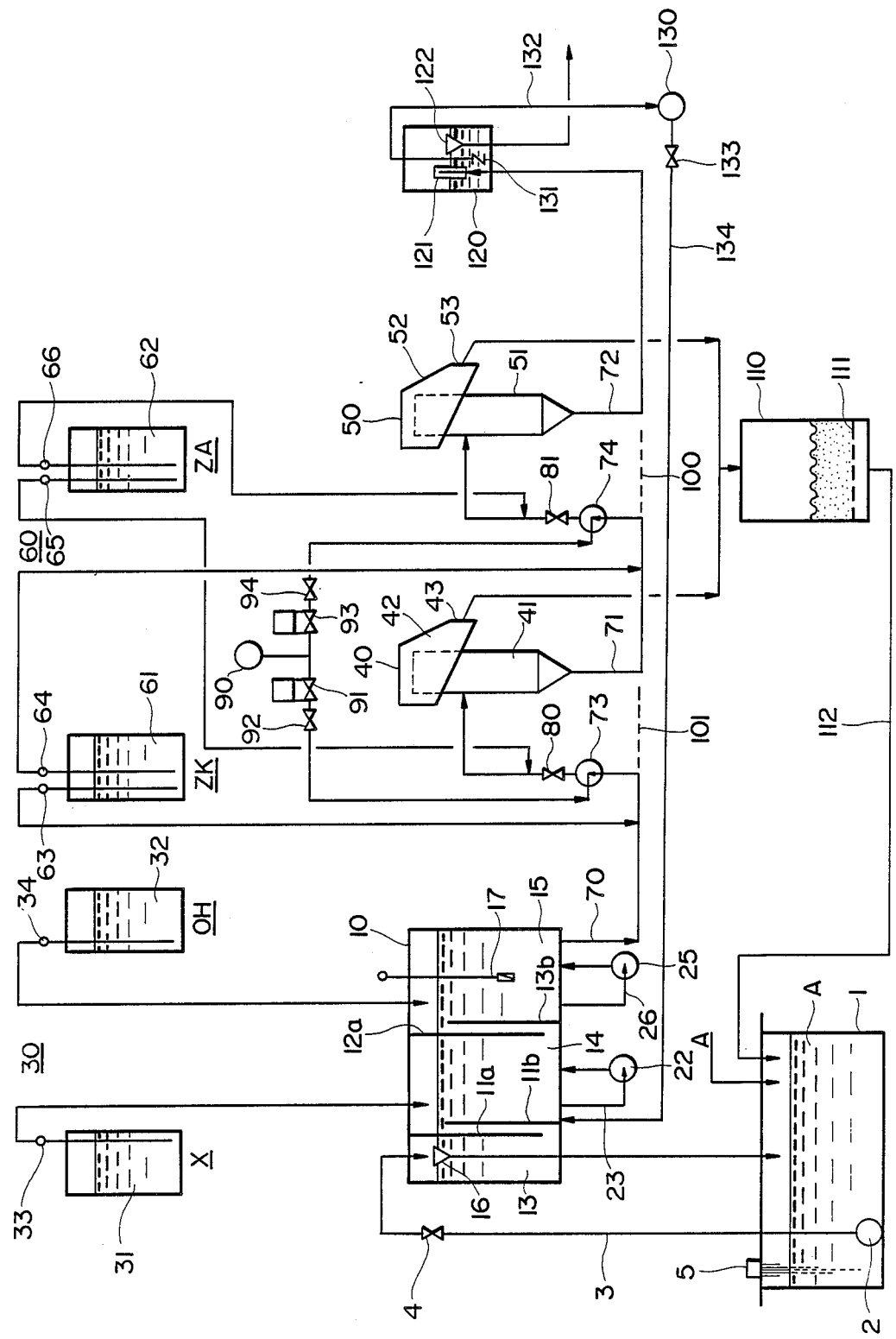

FLOTATION CYCLONE DEVICE

BACKGROUND OF THE INVENTION

1. FIELD OF THE INVENTION

This invention relates to the flotation cyclone device to float and separate the dissolved, suspended and settling solids within a waste water liquid.

2. PRIOR ART

Conventionally, though there have been many ways to separate and eliminate the dissolved, suspended and settling solids in the waste water such as filtering, coagulation, precipitation, electrolysis and pressure floatation, they have many problems of technical, of economical, of a treatment capacity, and of a locating condition.

The low pressure floatation ( Patent Application No. 54-2781) developped by this inventor before as a countermeasure of these problems has many advantages because it floats as a solid scum be mixing and stirring the waste water or pretreated waste water with a great amount of low pressure air and chemicals under existance of the foaming substances such as a surface -active agent, catching various flocs and suspended solids by the generated bubbles abundant with adhesive property, and adding a particular chemicals, however if it is used for the mass treatment, it is required further improvement of treatment capacity and of dehydration of the separated scum.

The diverse purposes and advantages of the invention and a better understanding thereof may be had by reference to the following description, taken in conjunction with the accompanying drawing, in which;

BRIEF DESCRIPTION OF THE DRAWINGS

FIG. 1 is a structural schematic view of an embodiment of the present invention.

DETAILED DESCRIPTION OF THE PREFERRED EMBODIMENT

The purpose of this invention is to improve the treatment capacity in the floatation process and to reduce the cost of equipment improving the dehydration of the separated scum using only natural dehydration and air-dry that have no need of mechanical dehydration process.

An embodiment of the present invention will be explained with reference to the drawings.

In FIG. 1, 1 is a raw water tank storing waste water to be treated of filtrated water from undermentioning scum dehydration tank 110 ( both liquid are written as raw water ), 2 is a pump to send the raw water A within the raw water tank to a conditional tank 10, 3 is a pipe, 4 is a valve, 5 is a water level sensing element sensing the water level of the raw water A within the raw water tank 1 to transmit a signal for starting and stopping of the pump 2.

10 is a conditional tank devided by the partition plate 11 and 12 into three ranks of the first tank 13, the second tank 14 and the third tank 15, and each tank is communicated by the open passage between each partition plate 11a–11b and 12a–12b. The first tank 13 is provided with an overflow system 16 to return the raw water to the raw water tank 1 in case the water surpassed the predetermined water level.

30 is a conditional chemicals supply apparatus providing, for example, with the chemicals tank 31 storing the chemicals (written as X-agent hereafter) to destroy emulsion within a oily emulsion waste water and with a chemicals tank 32 storing the chemicals (written as OH-agent hereafter) to adsorb and catch the dissociated floating oil, the X-agent is added into the second tank 14 by the pump 33 and the OH-agent is added into the third tank 15 by the pump 34. The third tank 15 is provided with a PHmeter 17 to add automatically proper quantity of OH-agent.

22 is a stirring pump to react by mixing the raw water with added X-agent, 23 is a pipe provided with a pump 22, 25 is a stirring pump to react by mixing the added OH-agent at the third tank 15, 26 is a pipe provided with a pump 25.

40 is a first floatation cyclone, 50 is a second floatation cyclone. 41 and 51 are the cyclone bodies, 42 and 52 are the receiving vessels of overflowed floated scum from cyclones, 42 and 53 are the outflow port of the scum, 110 is a scum dehydration tank receiving the outflowed scum from the scum outflow port 43 and 53 to separate liquid from scum by the filter sheet 111, and 112 is a pipe introducing the filtrate from the scum dehydration tank 110 to the raw water tank 1.

60 is a floatational chemicals supply apparatus provided with the ZK-agent tank 61 and ZA-agent tank 62 which agents are to make various flocs to scum within the conditional tank 10, the ZK-agent in the ZK-agent tank 61 is added by the pump 63 and 64 at just before the suction of the pump 73 and 74 of the pipe 70 and 71 and the ZA-agent in the ZA-agent tank 62 is added by the pump 65 and 66 at just after the discharge of the pump 73 and 74 of the pipe 70 and 71.

70 is a pipe introducing the liquid within the third tank 15 of the conditional tank 10 to the first floatation cyclone 40, 71 is a pipe introducing the underflow of the first floatation cyclone body 41 to the second floatation cyclone 50, 73 and 74 are the pumps located to the pipe 70 and 71, and 80 and 81 are the discharge control valves.

In addition, though the beforementioned chemicals within the chemicals tank 31 and 32 are not shown in the drawings, it is composed to be able to add also to the pipe 71.

90 is an air pump acts as an air supply apparatus, supplying the low pressure air to the pipe 70 and 71 at just before the suction of the pump 73 and 74 through the electromagnetic valve 91 and 93 and the discharge control valve 92 and 94.

100 is a communication pipe to communicate the underflow between the second floatation cyclone body 51 and the first floatation cyclone body 41, 101 is a communication pipe to communicate the underflow between the first floatation cyclone body 41 and the third tank 15 of the conditional tank 10, keeping a balance of each floatation cyclone water level.

120 is a discharge tank to store and release the underflow from the last step of the second floatation cyclone body 51 flows by the pipe 72, being able to control the liquid surface level of the second floatation cyclone 50 and the first floatation cyclone 40 by the level controller 121. 122 is an overflow apparatus.

130 is a circulating pump to feed the treated water within a discharge tank 120 according to demand to the second tank 14 of the conditional tank 10 through the suction pipe 132, discharge control vavle 133 and the pipe 134, 131 is a non-return valve to prevent the raw water in the conditional tank flows backward into the treated water tank 120 at the moment of the circulation stopped.

The operation of abovementioned device will be explained showing a example of oily emulsion waste water.

At first, the raw water A within the raw water tank 1 is sent by the pump 2 to the first tank 13 of the conditional tank 10. Together with the discharge by the pump 2 is controlled by the water level sensing element 5, the water level is settled not to be higher than the predetermined height by the overflow apparatus 16.

The raw water stored within the first tank 13 flows to the second tank 14 through the communicating passage consist of the partition plate 11a–11b, the X-agent from the agent tank 31 is added and stirred by the pump 22. The emulsion within the raw water is destroyed by this X-agent. The destroyed oily emulsion waste water flows to the third tank 15 through the communication passage consists of the partition plate 12a–12b, here, the OH-agent is added from the agent tank 32 and stirred by the pump 25, the decomposed and freed oils are adsorbed on the colloidal floc formed from the X-agent and the OH-agent.

The treated conditional raw water as above is send to the upper part of the first floatation cyclone body 41 through the pipe 70 by the pump 73. At this time, together with the low pressured air ( 0.1–0.2 Kg/m$^3$ ) is fed at just before the pump 73 from airpump 90, ZK-agent is added at the suction side and ZA-agent at the discharge side of the pump 73, the scum having a particular composition easy to float and difficult to destroy is formed.

The conditional raw water being sent to the first floatation cyclone 40, the scum is gathered at the center of the cyclone, floated and pressed by the centrifugal separation effect, received in receiving vessel as a overflow of the cyclone body 41, entered into the dehydration tank 110 through the outflow port 43, and dehydrated naturally. The filtrate of the scum dehydration tank 110 is introduced to the raw water tank 1.

The residual liquid whereof scum is centrifugal-floated like this is introduced to the second floatation cyclone 50 through the pipe 71 from under part of the cyclone body 41 by the pump 74. During this time, the low pressure air is fed by the air pump 90 in the same way, each ZK-agent and ZA-agent is added at the suction side and discharge side by the pump 64 and 66, being mixed and stirred by the pump 74.

In addition, the X-agent within the chemicals tank 31 is added to the pipe 71 according to demand.

And, the scum is separated at the second floatation cyclone body 51 in the same process, received into the receiving vessel 52 as a overflow of the cyclone body 51, entered into the scum dehydration tank 110 through the overflow port 53, dehydrated naturally, and the filtrate is introduced to the raw water tank 1. The underflow is discharged passing through the pipe 72 to outer through the discharge tank 120 having the level controller 121, or send to the conditional tank 10 by the circulating pump 130 as a partial circulating water.

As the water levels of the first and second floatation cyclone 40 and 50 are predetermined by the level controller 121 of the discharge tank 120, and as the underflow pipe 72 of the second floatation cyclone 50, that 71 of the first floatation cyclone 40, that 70 of the conditional tank 10 are communicated with the communication pipe 100 and 101, mutual water level balances are regulated automatically. Avove this, the open degree of the flow rate control valve 80 and 81 are to be controlled in the actual spot in accordance with each pump's efficiency, it is preferable that the degree of the open degree of the flow rate control valve 81 should be larger than that of the flow rate control valve 80.

In the next place, the example of the floatation treatment of the oily emulsion waste water according to the floatation cyclone device of the present invention is shown in Table-1.

Example raw water; oily emulsion waste water (mechanics maintenance works water water)
X-agent; Ferric chloride
OH-agent; Causticsoda
ZK-agent; Cationic polymer coagulant
ZA-agent; Anionic polymer coagulant
The adding amount of the chemicals to the raw water that is sent to the first floatation cyclone 40:
X-agent . . . 0.25 Kg/m$^3$ ( to the conditional tank 10 )
OH-agent . . . 0.25 Kg/m$^3$ ( to the conditional tank 10 )
ZK-agent . . . 0.01 Kg/m$^3$ ( to the pipe 70 )
ZA-agent . . . 0.01 Kg/m$^3$ ( to the pipe 70 )
The pH of the raw water to be sent to the first floatation cyclone 40 whereto the above chemicals are added =10.0
The adding amount of the chemicals added to the pipe 71 sending to the second floatation cyclone 50
X-agent . . . 0.05 Kg/m$^3$
ZK-agent . . . 0.005 Kg/m$^3$
ZA-agent . . . 0.005 Kg/m$^3$
The pH of the raw water sent to the second floatation cyclone device 50 whereto the above chemicals are added =8.5

TABLE 1

| Samples | Amount | pH | BOD (ppm) | COD (ppm) | SS (ppm) | n H (ppm) | Cd (ppm) | Cr$^{+6}$ (ppm) | Cu (ppm) | Pb (ppm) |
|---|---|---|---|---|---|---|---|---|---|---|
| Raw water | 1000 | 7.4 | 67 | 64 | 380 | 25 | 2.86 | <0.01 | 3.8 | 1.2 |
| Treated water | | 8.3 | 8 | 10 | 5 | 2 | 0.01 | <0.01 | 0.1 | 0.1 |
| Scum | *0.35 | | | | | | | | | |

Note:
The amount of the scum of *marking was derived after allowed to stand a whole day and it contained 65% of water. In addition, this scum is almost dried in a few days by an air-dry.

The floatation time at the first and second floatation cyclone 40 and 50 required both 1 minute.

And, in the case of the treatment of the raw water containing a heavy metal compound, only one side of chemicals tank 31 and 32 are used, wherein it is stored not the X-agent and OH-agent but the chemicals to precipitate the heavy metal compound ( this is written as the FA-agent ), which is added to the second (or the third) tank 14 (or 15).

In the next place, the Example of the floatation treatment according to the floatation cyclone device of the present invention is shown in Table-2.

Example raw water; alkaline battery works waste water
FA-agent; Linear Alkylbenzenesulfonic Acid Soda
ZK-agent; Cationic polymer coagulant
ZA-agent; Anionic polymer coagulant The adding amount of the chemicals to the raw water that is sent to the first floatation cyclone 40.

FA-agent ... 0.01 Kg/m$^3$
ZK-agent ... 0.01 Kg/m$^3$
ZA-agent ... 0.01 Kg/m$^3$ The adding amount of the chemicals added to the pipe 71 sending to the second floatation cyclone 50

ZK-agent ... 0.005 Kg/m$^3$
ZA-agent ... 0.005 Kg/m$^3$

TABLE 2

|  | pH | Cd (ppm) | SS (ppm) |
|---|---|---|---|
| Raw water | 13.40 | 2.0 | 100 |
| Treated water | 13.40 | 0.01 | 5 |
| Elimination rate |  | 99.5% | 99.5% |

In addition, the floatation time at the first and the second floatation cyclone 40 and 50 required 1 minute.

In the actual survey as above, the water quality of the treated water was good enough, especially the residence time within the cyclones was short and compared with the conventional time required to coagulate, settle and pressure-float, it needed extremely short. And compared with the low pressure floatation, it also required extremely short time.

That is to say, as for the above raw water, the separation time by the other conventional ways such as cohesion settling method, pressure floating method, low pressure floating method and that by the floatation device of above present invention are surveyed as shown in Table-3.

TABLE 3

|  | Cohesion settling | Pressure floating | Low pressure floating | Cyclone floating |
|---|---|---|---|---|
| Separation time | 100 m. | 30 m. | 5 m. | 1 m. |

In addition, the number of the floatation is decided according to the water qualities of the raw water and the properties of the floc, and it may be done not by three steps as above but by more steps than them. And, addition order of the above mentioned ZA-agent may be inverted according to the kinds of the raw water.

As is explained above, the floatation cyclone device of the present invention increases extremely the treatment efficiency separating the dissolved, suspended and settling solids within a waste water, has the high dehydration and air-dry of the scum, and has no need of complicated mechanical filtering dehydration which is wanted to avoid, and using a much smaller cyclone than the conventional floatation tank, the treatment equipment is possible to be in simple and it can lower the equipment cost.

Having thus described the present invention by way of a typical embodiment thereof, what is claimed as new is as follows;

1. An apparatus for treating water containing separable contaminant, comprising means for reducing the amount of energy required for satisfactorily separating said contaminant from said water by floculation and floatation, said means including in combination means for directing a flow of said water, and a contaminant separating state, including, means for admixing a first flocculant with water in said flow directing means;
   downstream means for admixing air with said admixture of water and first flocculant;
   further downstream means for admixing a second different flocculant with said admixture of air, water and first flocculant; said first and second flocculants together being capable of associating with said separable contaminant to form a floc separable from said water; and
   means for separating said floc from said water.

2. The invention according to claim 1, wherein said separating means comprises a cyclone separator.

3. The invention according to claim 1, wherein said apparatus comprises two of said separating stages, disposed in series.

4. The invention according to claim 3, wherein said apparatus further comprises means for combining floc from said two stages, and means for combining water from said two stages.

5. The invention according to claima 4, wherein said water combining means is fluidly connected to said flow directing means.

6. The invention according to claim 1, wherein said flow direction means comprises a conditioning tank upstream of said contaminant separating stage.

7. The invention according to claim 6, wherein said apparatus further comprises means supplying at least one conditioning chemical to said conditioning tank.

8. The invention according to claim 7, wherein said conditioning tank includes a generally sequential plurality of tank segments, and said chemical supplying means comprises means for supplying an individual one of a plurality of different conditioning chemicals to each of said segments.

9. The invention according to claim 7, wherein said conditioning chemical is at least one of fabric chloride and caustic soda.

10. The invention according to claim 1, wherein said flow directing means further comprises a scum dehydration tank downstream of said contaminant separating stage.

11. The invention according to claim 10, wherein said flow directing means additionally comprises a conditioning tank upstream of said contanaint separating stage, and means fluidly connecting said scum dehydration tank to said conditioning tank.

12. The invention according to claim 11, wherein said means fluidly connecting said scum dehydration tank to said conditioning tank includes a water storage tank.

13. The invention according to claim 1, wherein one of said first and second flocculants is a cationic polymer coagulant, and the other of said se cond and first floccu lants is an anionic polymer coagulant.

14. A method of treating water containing separable contaiminant, comprising: reducing the amount of energy required for satisfactorily separating said contaminant from said water by floculation and floatation, by the sequential steps of:

admixing a first flocculant with said water;
   admixing air with said admixture of water and first flocculant;
   admixing a second different flocculant with said admixture of air, water and first flocculant; said first and second flocculants together being capable of associating with said separable contaminant to form a floc separable from said water; and separating said floc from said water.

15. The invention according to claim 14, wherein said separating step is carried out employing a cyclone separator.

16. The invention according to claim 14, wherein said sequential steps are repeated to treat the water left upon performance of said separating step.

17. The invention according to claim 16, further comprising combining the floc obtained from each of said separating steps, and combining the water obtained from each of said separating steps.

18. The invention according to claim 17, further comprising admixing said combined water with contaminated water to be treated.

19. The invention according to claim 14, further comprising conditioning said contaminated water prior to said first admixing step.

20. The invention according to claim 19, wherein said conditioning is carried out by supplying at least one of ferric chloride and caustic soda to said contaminated water.

21. The invention according to claim 19, wherein ferric chloride and caustic soda are supplied one at a time to said contaminated water.

22. The invention according to claim 21, wherein said ferric chloride and said caustic soda are each supplied at a rate of about 0.5 to 0.25 $Kg/m^3$ of contaminated water to be treated.

23. The invention according to claim 14, wherein said floc is subsequently treated in a scum dehydration tank.

24. The invention according to claim 14, wherein one of said first and second flocculants is a cationic polymer coagulant, and the other of said second and first flocculants is an anionic polymer coagulant.

25. The invention according to claim 24, wherein said first and second flocculants are supplied at a rate of about 0.005 to 0.01 $Kg/m^3$ of contaminated water to be treated.

* * * * *

UNITED STATES PATENT AND TRADEMARK OFFICE
CERTIFICATE OF CORRECTION

PATENT NO. : 4,738,783
DATED : April 19, 1988
INVENTOR(S) : Kazutoyo Sugihara and Yasuhide Kinoda It is certified that error appears in the above-identified patent and that said Letters Patent is hereby corrected as shown below:

Col. 1, line 13, delete "floatation" and insert --flotation--;

line 16, delete "floatation" and insert --flotation--;

line 17, delete "developped" and insert --developed--;

line 41, delete "floatation" and insert --flotation--;

line 50, delete "liquid" and insert --liquids--;

line 52 after "tank", insert --1--;

line 57, delete "devided" and insert --divided--;

delete "plate" and insert --plates--;

Col. 2, line 2, delete "adsorb" and insert --absorb--;

line 6 after "automatically", insert --a--;

line 13, delete "floatation" and insert --flotation--; both occurrences;

line 16 after "cyclones", insert --40 and 50--;

line 22, delete "floatational" and insert --flotational--;

line 32, delete "floatation" and insert --flotation--;

line 35, delete "flotation" and insert --flotation-- both occurrences;

line 43 after "pump", insert --which--;

UNITED STATES PATENT AND TRADEMARK OFFICE
CERTIFICATE OF CORRECTION

PATENT NO. : 4,738,783
DATED : April 19, 1988
INVENTOR(S) : Kazutoyo Sugihara and Yasuhide Kinoda It is certified that error appears in the above-identified patent and that said Letters Patent is hereby corrected as shown below:

Col. 2, line 49, delete "floatation" and insert --flotation--;

line 50, delete "floatation" and insert --flotation--;

line 52, delete "floatation" and insert --flotation--;

line 54, delete "floatation" and insert --flotation--;

line 56, delete "floatation" and insert --flotation--;

line 58, delete "floatation" and insert --flotation--;

line 59, delete "floatation" and insert --flotation--;

line 64, delete "vavle" and insert --valve--;

line 66, delete "flows" and insert --from --flowing--;

line 67, delete "of";
after "circulation", insert --is--;

Col. 3, line 2, delete "a" and insert --an--;

line 12, delete "consist" and insert --consisting--;

line 17, delete "consists" and insert --consisting--;

delete "here";

UNITED STATES PATENT AND TRADEMARK OFFICE
CERTIFICATE OF CORRECTION

PATENT NO. : 4,738,783
DATED : April 19, 1988
INVENTOR(S) : Kazutoyo Sugihara and Yasuhide Kinoda It is certified that error appears in the above-identified patent and that said Letters Patent is hereby corrected as shown below:

Col. 3, line 19, delete "adsorbed" and insert --absorbed--;

line 22, delete "send" and insert --sent-- line 23, delete "floatation" and insert --flotation--;

line 26, delete "airpump" and insert --air pump--;

line 32, delete "floatation" and insert --flotation--;

line 34 after "vessel", insert --42--;

change "a" to --an--;

line 40, delete "floatation" and insert --flotation--;

line 61, delete "floatation" and insert --flotation--;

Col. 4, line 1, delete "send" and insert --sent--;

line 2, delete "a"

line 3, delete "floatation" and insert --flotation--;

line 6 after "that", insert --pipe--;

delete "floatation" and insert --flotation--;

line 7 after "that", insert --pipe--;

UNITED STATES PATENT AND TRADEMARK OFFICE
CERTIFICATE OF CORRECTION

PATENT NO. : 4,738,783
DATED : April 19, 1988          Page 4 of 6
INVENTOR(S) : Kazutoyo Sugihara and Yasuhide Kinoda It is certified that error appears in the above-identified patent and that said Letters Patent is hereby corrected as shown below:

Col. 4, line 7, delete "floatation" and insert --flotation--;

line 10, delete "Avove" and insert --Above--;

line 16, delete "floatation" and insert --flotation--;

line 18, delete "floatation" and insert --flotation--;

line 25, delete "causticsoda" and insert --Caustic soda--;

line 29, delete "floatation" and insert --flotation--;

line 35, delete "floatation" and insert --flotation--;

line 39, delete "floatation" and insert --flotation--;

line 43, delete "floatation" and insert --flotation--;

line 58, delete "floatation" and insert --flotation--both occurrences;

line 67, delete "floatation" and insert --flotation--;

line 68, delete "floatation" and insert --flotation--;

Col. 5, line 8, delete "floatation" and insert --flotation--

UNITED STATES PATENT AND TRADEMARK OFFICE
CERTIFICATE OF CORRECTION

PATENT NO. : 4,738,783
DATED : April 19, 1988    Page 5 of 6
INVENTOR(S) : Kazutoyo Sugihara and Yasuhide Kinoda It is certified that error appears in the above-identified patent and that said Letters Patent is hereby corrected as shown below:

Col. 5, line 13, delete "floatation" and insert --flotation--;

line 24, delete "floatation" and insert --flotation--;

line 25, delete "floatation" and insert --flotation--;

line 31, delete "floatation" and insert --flotation--;

line 36, delete "floatation" and insert --flotation--;

line 46, delete "floatation" and insert --flotation--;

line 49, after "And", insert --in--;

line 52, delete "floatation" and insert --flotation--;

line 59, delete "floatation" and insert --flotation--;

line 60, delete "in";

line 69, delete "floatation" and insert --flotation--;

Col. 6, line 2, delete "state" and insert --stage--;

line 23, delete "claima" and insert --claim--;

line 27, delete "direction" and insert --directing--;

UNITED STATES PATENT AND TRADEMARK OFFICE
CERTIFICATE OF CORRECTION

PATENT NO. : 4,738,783

DATED : April 19, 1988  Page 6 of 6

INVENTOR(S) : Kazutoyo Sugihara and Yasuhide Kinoda

It is certified that error appears in the above-identified patent and that said Letters Patent is hereby corrected as shown below:

Col. 6, line 40, delete "fabric" and insert --ferric--;

line 48, delete "containant" and insert --contaminant--;

line 56, delete "se cond" and insert --second--;

line 59, delete "contaiminant" and insert --contaminant--;

line 61, delete "floatation" and insert --flotation--.

Signed and Sealed this

Twenty-second Day of November, 1988

Attest:

DONALD J. QUIGG

*Attesting Officer*   Commissioner of Patents and Trademarks